Oct. 16, 1962 H. A. ZEIGLER 3,058,253
FISHING ROD HANDLE WITH REEL LOCKING DEVICE
Filed June 20, 1960
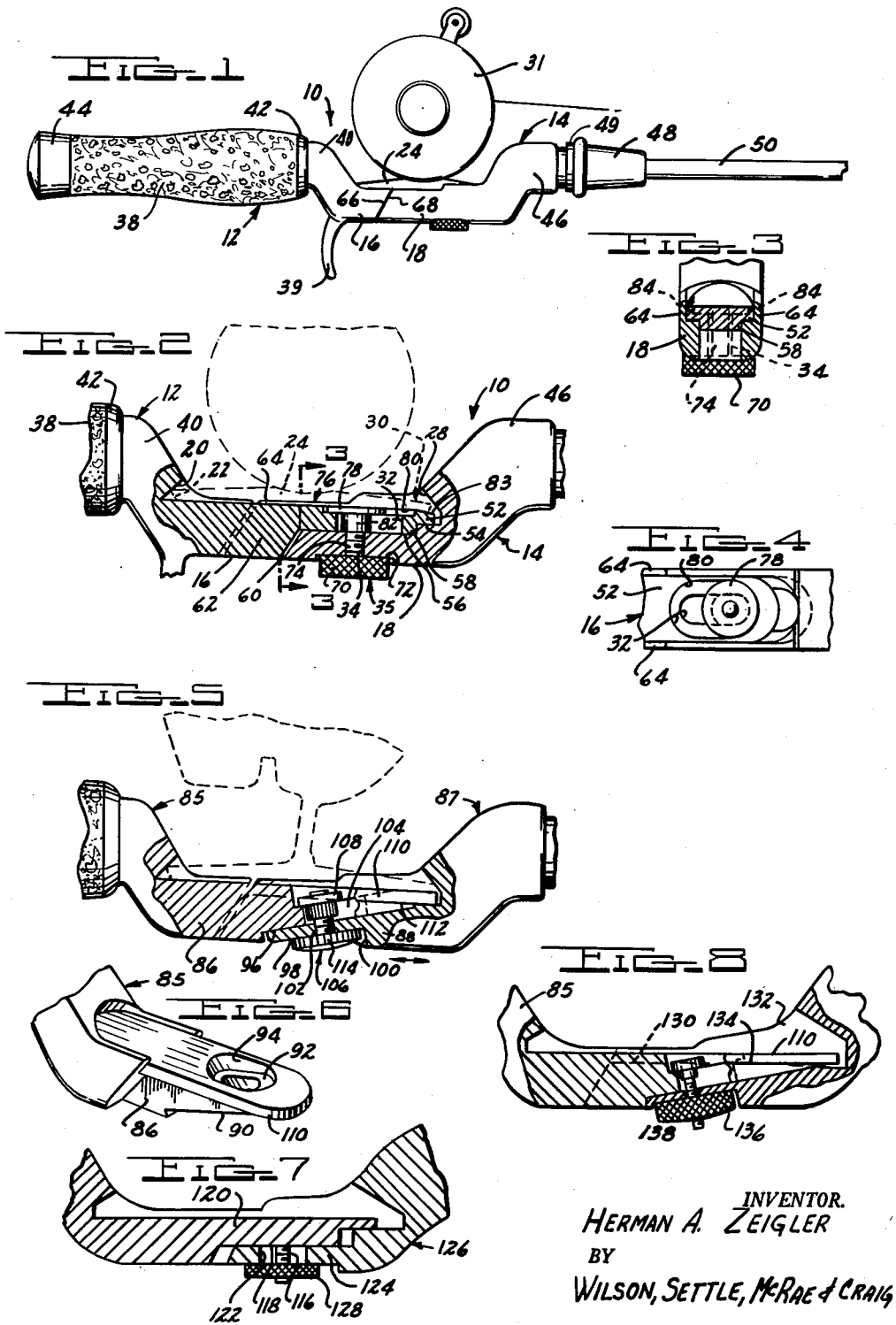
INVENTOR.
HERMAN A. ZEIGLER
BY
WILSON, SETTLE, McRAE & CRAIG
ATTORNEYS

United States Patent Office 3,058,253
Patented Oct. 16, 1962

3,058,253
FISHING ROD HANDLE WITH REEL LOCKING
DEVICE
Herman A. Zeigler, 22601 Beech St., Dearborn, Mich.
Filed June 20, 1960, Ser. No. 37,507
3 Claims. (Cl. 43—22)

This invention relates to fishing rod handles, and more particularly to a handle adapted to grip and hold a reel, such as a casting reel or a spin cast or trolling reel, in an improved manner.

I have previously disclosed an improved fishing rod handle, application Serial No. 694,792, filed November 6, 1957, now Patent No. 2,955,376. The present invention provides a handle having similar operational characteristics as the handle disclosed in the aforementioned patent application, however, it is less costly to manufacture and has improved functional characteristics.

Fishing reels are customarily provided with a relatively thin rectangular-shaped base adapted to be secured to a depressed portion of a handle in order to position the reel in such a manner that the fisherman can place his thumb on the reel to provide a controlled drag thereon. The fisherman is thus able to control the rotation of the reel and the flow of the line from the reel to prevent the line from becoming doubled back upon itself to cause a back-lash resulting in the tangling of the line.

In securing such reels to rod handles it has been common practice to project one end of the rectangular shaped base into an undercut portion formed in the base of the handle and to push a ferrule over the other end of the base of the reel to fasten it to the handle.

This type of fastener has not proven to be fully satisfactory because it does not hold the reel with a sufficient degree of firmness and as a result, the rod, reel and handle combination do not present to the fisherman a feeling of solidness. This type of fastener is difficult to use and does not hold the reel from shifting sidewise slightly, particularly while the fisherman is attempting to land a heavy fish.

An object of my invention is to provide an improved fishing rod handle having a novel reel clamping mechanism whereby the reel can be firmly clamped to the rod-carrying handle in such a manner as to prevent the reel from shifting on the handle, particularly when subjected ot heavy stresses.

A further object of my invention resides in the provision of an improved attaching mechanism for securing a reel to a handle in such a manner that a single handle may readily receive reels having bases of different sizes.

Another object of my invention is to provide a novel reel attaching mechanism which can be easily operated and which does not require any particular skill to use whereby an angler can quickly assemble his rod and reel and be ready for fishing with the minimum delay.

Still a further object of my invention is to provide an improved attaching mechanism for securing a reel to a rod handle wherein the rod handle is provided in two parts which are secured together by threaded fastening means which permit the handle to be locked in a reel engaging position and which may be released for removing the reel from the handle.

A further object of my invention resides in the provision of means in one embodiment for securely holding the two handle portions together even if the threaded fastening means becomes unloosened.

Yet another object of my invention is to provide an improved fishing rod handle which can be economically manufactured and which inherently possesses strong sales appeal for attracting a fisherman's interest in its ability to hold the reel in assembled relation with the rod and handle in an interesting and improved manner.

Other objects of this invention will appear in the following description and appended claims, reference being had to the accompanying drawings forming a part of this specification wherein like reference characters designate corresponding parts in the several views.

In the drawings:

FIG. 1 is a side elevational view of one embodiment of my improved handle showing a fishing reel and rod mounted thereon;

FIG. 2 is a side elevational view of the FIG. 1 embodiment partly in section for the purpose of clarity;

FIG. 3 is a cross-sectional view of the handle of FIG. 2 taken substantially along the line 3—3 looking in the direction of the arrows;

FIG. 4 is a top plan view of a portion of the handle of FIG. 2 showing the handle portions in open position;

FIG. 5 is a side elevational view partly in section of another embodiment of my invention which includes positive locking means to hold the handle portions together;

FIG. 6 is a perspective view of a finger provided on one handle portion of the FIG. 5 embodiment;

FIG. 7 is a cross-sectional view similar to FIG. 2, showing another arrangement of the locking means; and FIG. 8 is a side elevational view partly in section of a modification of the FIG. 5 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As may be seen in FIGS. 1 and 2, the handle 10 comprises a hand-grip member 12 and a separate rod-holding member 14. The hand-grip member has a forwardly projecting finger 16 and the rod-holding member has a rearwardly projecting finger 18 which overlaps the finger 16. These fingers form a depressed reel supporting section interposed between the hand-grip member and the rod-holding member.

A first undercut portion 20 is provided at the one end of the reel-supporting section for engaging the first end 22 of a reel-base 24 forming part of the reel 31. A second undercut portion 28 is provided at the opposite end of the reel-supporting section for engaging the second end 30 of the reel-base 24. Each of the fingers has an opening 32, 34 therethrough. Manually operable threaded fastening means 35 extend through both of these openings to lock the hand-grip member and the rod-holding member together in reel-engaging position. One of the openings 32 is elongated to permit the length of the reel-supporting section to be adjustable to fit different sized reels and to permit insertion and removal of the reel.

The remaining structure of the handle is substantially conventional. The hand-grip member is provided with a gripping member 38, preferably fabricated from cork, having a hollow construction and secured to the frame member end portion 40. The cork grip 38 preferably abuts against a flange 42, and is secured in place as by gluing. A plastic butt cap 44 is secured to the end of the cork grip 38. The cap may be colored as desired for appearance. A trigger-shaped member 39 depends from portion 40 to assist the fisherman in firmly grasping the handle.

The rod-holding member 14 has a rod receiving member 46, preferably substantially aligned with the cork grip 38. The rod-receiving member is of standard construction and includes an internally threaded ferrule 48 which is threaded onto a threaded section 49 which is slotted to provide contractible fingers to grip and hold the rod 50 upon the threading of the ferrule inwardly.

Referring more specifically to the structural details of the arrangement of the fingers 16, 18 and fastening means 35, attention is directed to FIGS. 2, 3 and 4. The finger 16 has a forwardly extending section 52 which is receivable in recess 54 provided in the finger 18. The recess has a stepped portion 56 which receives a similarly stepped portion 58 of the finger 16. The recess is extended entirely through finger 18 at 60 to receive a third stepped portion 62 of the finger 16. The outer walls 64 of the finger 18 enclose the inserted portions of finger 16 to thus guide and align the finger along the longitudinal axis of the handle. The slanted ends 66, 68 of the fingers abut against each other when the handle is in the fully closed position as shown in FIG. 1, and thus act as stop members.

The fastening means 35 comprises a bolt having a knurled head 70 receivable in recess 72 of the finger 18, and a threaded stem 74 which extends through openings 32, 34 into engagement with a nut 76. The nut has a rounded head portion 78 which rides in recess 80 provided in the surface of finger 16. A reduced portion 82 of the nut extends into the elongated opening 32. The side walls 84 of the reduced portion are flat and abut against the side walls of the opening 32 to prevent the nut from turning when the bolt is threaded in and out.

In assembling the reel relative to the handle, the bolt is loosened to permit extension of the handle members. One end of the reel base is then positioned in one of the undercut portions, and the other end of the reel-base is dropped onto the reel-supporting section in alignment with the other undercut portion. The handle sections 12, 14 then are pushed together until the ends of the reel-base engage the walls of the undercut portions. The bolt is then tightened to lock the handle portions together.

It will be noted that the end surface 83 of the finger 16 inclines downwardly adjacent the undercut portion 28. The function of this inclination is to permit the outer end of the reel-base to be deflected downwardly by the undercut portion to provide a more secure clamping action.

The embodiment shown in FIG. 5 is in most respects similar to the FIG. 2 handle. As in the FIG. 2 showing, the hand-grip member 85 has a forwardly projecting finger 86 and the rod-holding member 87 has a separate rearwardly projecting finger 88 which cooperate as previously described. However, as shown in FIG. 6, the undersurface 90 of finger 86 inclines outwardly and upwardly towards the outer end of the finger. Similarly, the bottom surface 92 of recess 94 inclines in the same direction. As may be seen in FIG. 5, the upper surface 96 of finger 88 and surface 98 of recess 100 also have the same inclination. The opening 102 of finger 88, and the elongated opening 104 through finger 86 have their central axes perpendicular to the various inclined surfaces.

The result of this arrangement is that the bolt 106 and nut 108 are positioned at an angle to the longitudinal axes of the fingers 86, 88. This provides a positive locking feature in addition to the normal frictional locking engagement of the various parts. The nut and bolt may sometimes work loose during use of the fishing rod handle. When this happens, for example with the FIG. 2 embodiment, the two handle parts are free to separate, permitting the reel to fall out. However, with the FIG. 5 embodiment, if the nut and bolt work loose, the handle still cannot separate completely because separation of the handle parts must take place along the longitudinal axis of the handle. Separation cannot take place along the plane of the various inclined surfaces because of the sliding abutment of the upper finger portion 110 against the surface 112 of the rod-holding finger 88. Separation of the handle members along the longitudinal plane of the handle will tend to expand the portion of the handle between the nut 108 and head 114 of the bolt. This expansion causes a wedging action to take place whereby further separation of the hand-grip member and the rod-holding member is prevented. In order to completely separate the handle members, the bolt must be almost completely threaded out of the nut. The resultant positive locking feature is advantageous in that it prevents the reel from ever falling out of the handle and becoming lost or damaged.

It will be appreciated that the inclined surfaces shown in FIG. 5 may be reversed in direction, i.e., extend upwardly to the left on the rod-holding finger and downwardly to the right on the hand-grip finger. The important feature to retain in any modification is to be sure that the threaded fastening means extends through the fingers at an angle to the longitudinal slide of the fingers.

Another embodiment of the invention is illustrated in FIG. 7. The FIG. 7 embodiment is quite similar to the FIG. 2 embodiment excepting that the threaded stem 116 is provided as a stud on the underside 118 of the hand-grip finger extension 120. The stem 116 extends through elongated opening 122 provided in the finger 124 of rod-holding member 126. A nut 128 is threadingly received on the stem 116 to hold the handle portions together as shown. The nut 128 may be loosened to permit opening of the handle for insertion of a reel as previously described.

A modification of the FIG. 5 embodiment is shown in FIG. 8. As will be noted in FIG. 8, the surface 130 of the rod-holding member 132 is slanted downwardly beginning at point 134. As will be recalled, the surface 130 slidingly supports the upper finger portion 110 of hand-grip member 85. The remainder of the rod holding member and the hand-grip member 85 is identical with the FIG. 5 embodiment.

In operation, when the hand-grip member is inserted into the rod-holding member, it will assume a position parallel to the slanted portion of surface 130 with the result that the assembly will be cocked out of its normal reel-engaging position. When the nut 136 of screw 138 is tightened, the hand-grip member will pivot about fulcrum point 134 until it is parallel with the longitudinal plane of the rod-holding members as shown in FIG. 8. During this movement, the undercut portion 137 of the rod-holding member will move towards the surface of the finger portion 110. This serves to more securely clamp the base of the reel which is mounted in the handle.

Having thus described my invention, I clam:

1. In a handle for a fishing reel, a hand-grip member having a forwardly projecting finger; a separate rod-holding member having a rearwardly projecting finger which overlaps the hand-grip finger and is slidable longitudinally with respect thereto; said fingers forming a depressed reel-supporting section interposed between the hand-grip member and the rod-holding member; a first undercut portion at one end of the reel-supporting section for engaging the first end of a reel-base; a second undercut portion at the opposite end of the reel-supporting section for engaging the second end of a reel-base; each of said fingers having an opening therethrough; and manually operable threaded fastening means extending through both of said openings to lock the hand-grip member and the rod-holding member together in reel-engaging position; one of said finger openings being elongated whereby the length of the reel-supporting section is adjustable; said fastening means including a stem extending through said elongated opening at an angle other than the transverse angle to the longitudinal slide of said fingers and terminating in an enlarged head which abuts against the outer surface of the finger having the elongated opening; said outer surface inclining outwardly towards the free end of said last-mentioned finger to lockingly engage said enlarged head and wedge said fingers together to prevent longitudinal separation thereof, the forwardly projecting hand-grip finger sliding on a surface of the rod-holding finger; said surface of the rod-holding finger inclining away from the forward end of said hand-grip finger whereby to provide a fulcrum to move the forward end of the hand-grip finger and the adjacent undercut portion of the rod-holding member closer together to securely clamp a reel base.

2. In a handle for a fishing reel, a hand-grip member having a forwardly projecting finger; a separate rod-holding member having a rearwardly projecting finger which overlaps the hand-grip finger and is slidable longitudinally with respect thereto; said fingers forming a depressed reel-supporting section interposed between the hand-grip member and the rod-holding member; a first undercut portion at one end of the reel-supporting section for engaging the first end of a reel-base; a second undercut portion at the opposite end of the reel-supporting section for engaging the second end of a reel-base; tongue and groove means guiding said hand-grip member and said rod-holding member for relative longitudinal displacement in a single plane, manually operable threaded fastening means traversing said members to secure said members in assembly and including relatively rotatable nut and bolt elements relatively adjustable along an axis intersecting said plane, one of said members having an elongated slot through which said fastening means projects to accommodate relative longitudinal displacement of said members for receiving reel bases of different lengths, and one of said members having a wedging surface disposed in a plane intersected by the axis of adjustment of said threaded fastening means but inclined with respect to said single plane and effectively wedged between said nut and bolt elements in the event of slight separation of said undercut portions upon relative movement of said members to prevent further separatory movement of said portions.

3. In a handle for a fishing reel having a hand-grip member having a forwardly projecting finger, a separate rod-holding member having a rearwardly projecting finger which overlaps the hand-grip finger and is slidable longitudinally with respect thereto, said fingers forming a depressed reel-supporting section interposed between the hand-grip member and the rod-holding member, a first undercut portion at one end of the reel-supporting section for engaging the first end of a reel-base, and a second undercut portion at the opposite end of the reel-supporting section for engaging the second end of a reel-base; the improvements of means guiding said hand-grip member and said rod-holding member for relative longitudinal displacement in a single plane, manually operable threaded fastening means traversing said members and securing said members in assembly while being relatively adjustable along an axis intersecting said plane, one of said members having an elongated slot through which said fastening means projects to accommodate relative longitudinal displacement of said members, and one of said members having a wedging surface disposed in a plane intersected by the axis of adjustment of said threaded fastening means but inclined with respect to said single plane, said wedging surface urging said fastening means against said members upon attempted relative movement of said members to increase the distance between said undercut portions in the event of accidental loosening of said fastening means.

References Cited in the file of this patent

UNITED STATES PATENTS

| | | |
|---|---|---|
| 613,663 | Case | Nov. 8, 1898 |
| 799,106 | Stevens | Sept. 12, 1905 |
| 871,117 | Finney | Nov. 19, 1907 |
| 1,775,044 | McConnell | Sept. 2, 1930 |
| 1,843,714 | Fuller | Feb. 2, 1932 |
| 1,887,913 | Bell | Nov. 15, 1932 |
| 2,485,144 | Epenship | Oct. 18, 1949 |

FOREIGN PATENTS

| | | |
|---|---|---|
| 784,145 | France | Apr. 23, 1935 |
| 2,606 | Great Britain | 1910 |